Dec. 8, 1959  P. F. ELARDE  2,916,695
ELECTRICAL TESTING APPARATUS
Filed Jan. 31, 1955  2 Sheets-Sheet 1

INVENTOR
P. F. ELARDE
BY C. B. Hamilton
ATTORNEY

Dec. 8, 1959 P. F. ELARDE 2,916,695
ELECTRICAL TESTING APPARATUS
Filed Jan. 31, 1955 2 Sheets-Sheet 2

INVENTOR
P. F. ELARDE
BY C. B. Hamilton
ATTORNEY

United States Patent Office 2,916,695
Patented Dec. 8, 1959

2,916,695
ELECTRICAL TESTING APPARATUS

Paul F. Elarde, Westchester, Ill., assignor to Western Electric Company, Incorporated, New York, N.Y., a corporation of New York Application January 31, 1955, Serial No. 485,161

15 Claims. (Cl. 324—40)

This invention relates to electrical testing apparatus, and more particularly to apparatus for drawing B–H curves for magnetic cores.

An object of the invention is to provide apparatus for measuring magnetic properties of coil cores.

Another object of the invention is to provide apparatus for automatically measuring B–H characteristics of magnetic cores.

Another object of the invention is to provide apparatus for automatically cycling a coil having a magnetic core and recording each increment of change between the induction of the core and the magnetomotive force of the coil.

Another object of the invention is to provide apparatus for cyling automatically an electrical coil having a magnetic core through 450°, measuring each increment of change of permeability of the core and current through the coil and drawing the resulting B–H curve.

A further object of the invention is to provide apparatus for cycling and recording the B–H curve of an electrical coil having a magnetic core and for varying the magnetomotive force applied to the coil non-linearly to compensate for lag in recording components of the apparatus.

An apparatus illustrating certain features of the invention may include a platen for supporting a web of graph paper and a stylus. A first mechanism is provided for effecting relative movement between the platen and the stylus along one coordinate and a second mechanism also is provided for effecting relative movement between the stylus and the platen along the other coordinate. A cycling device serves to apply an alternating voltage through 450° electrical degrees to a coil having a magnetic core, and the first movement effecting mechanism is shifted in accordance with change in the flux density of the core and the second movement effecting mechanism is shifted in accordance with the change in current through the coil so that the stylus draws a B–H curve on the graph paper.

An apparatus illustrating the invention more specifically may include a drum carrying a sheet of graph paper rotatable by a servomotor drive which is actuated in proportion to current being supplied to a test coil having a magnetic core. A stylus for marking paper is reciprocable along the drum by a second servomotor drive which is actuated in proportion to the direction and density of flux in the coil core.

Figure 1:
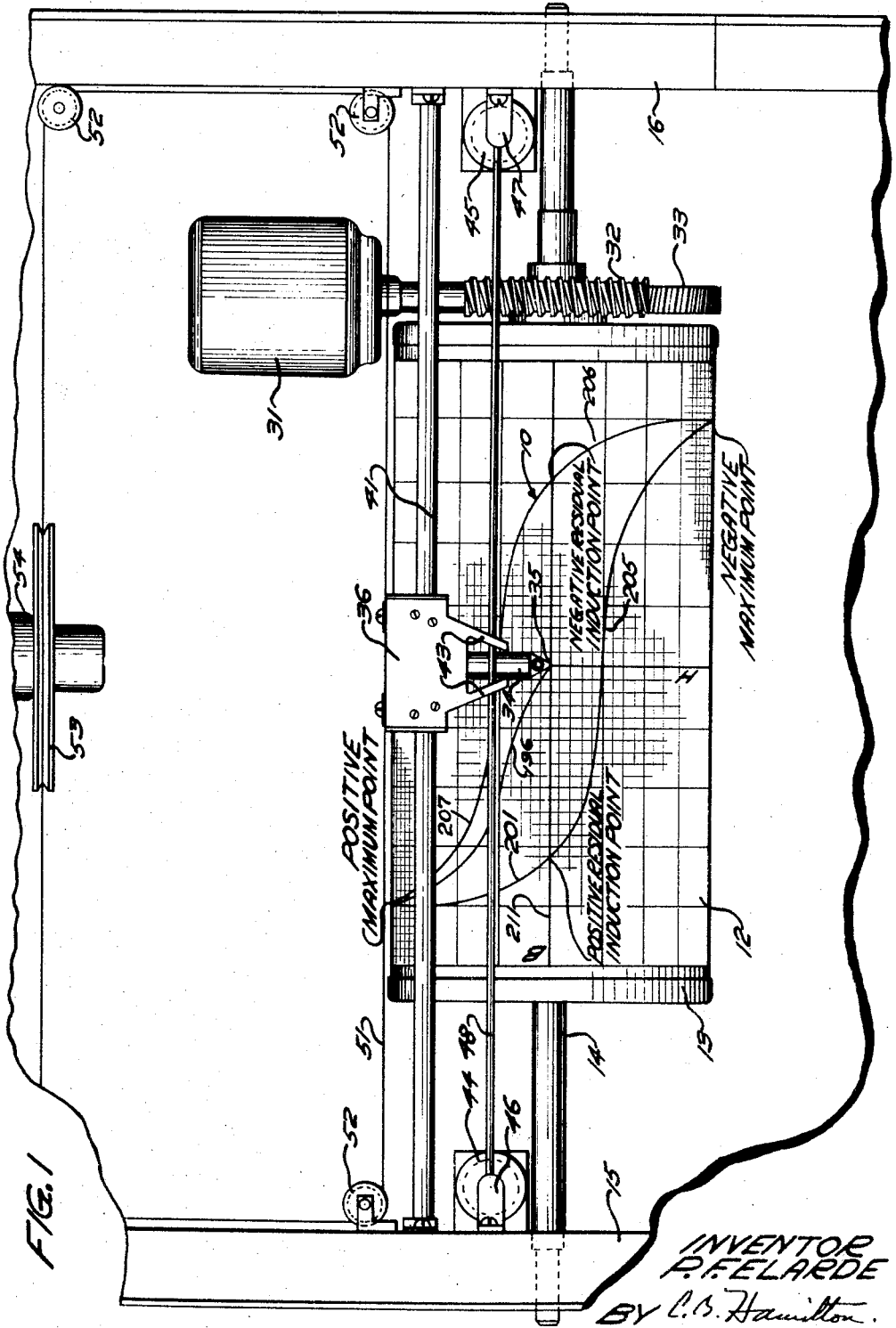
Figure 2:
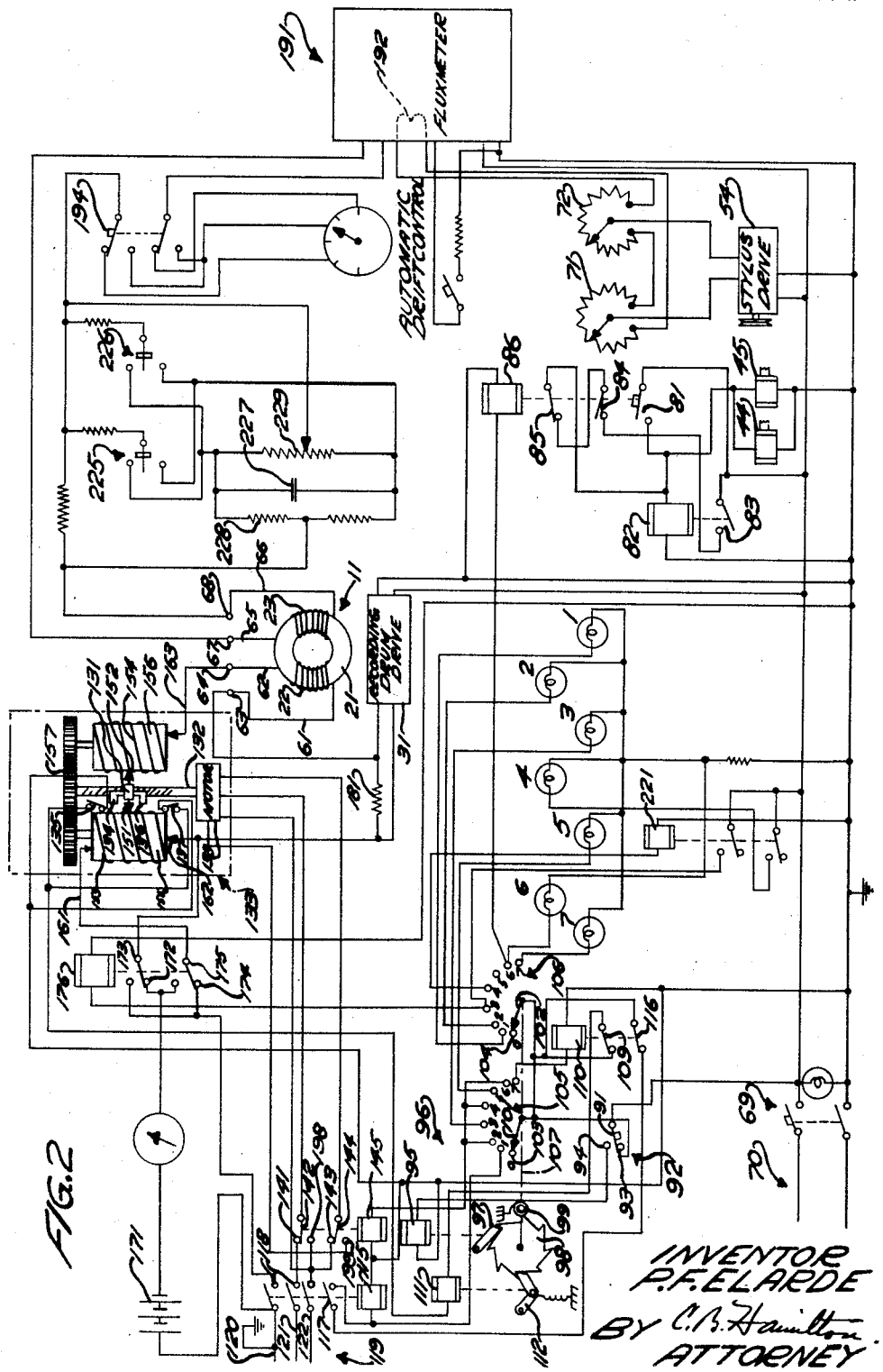

A complete understanding of the invention may be obtained from the following detailed description of an apparatus forming a specific embodiment thereof, when read in conjunction with the appended drawings, in which Fig. 1 is a fragmentary top plan view of an apparatus forming one embodiment of the invention, and Fig. 2 is a diagrammatic view of an electrical circuit of the apparatus shown in Fig. 1.

Referring now in detail to the drawings, there is shown therein an apparatus for measuring and drawing automatically a B–H curve 10 of a coil 11 (Fig. 2) on a sheet 12 (Fig. 1) of a graph paper fixed to a drum 13 keyed to a shaft 14 rotatably mounted in cabinet walls 15 and 16. The coil 11 (Fig. 2) includes a ring core 21 of known dimensions, whose B–H curve is to be determined, a primary winding 22 of a predetermined number of turns and a secondary winding 23 of a predetermined number of turns.

A servomotor drive 31 serves to rotate the drum 13 through a worm gear 32 and pinion 33 in accordance with the direction of and magnitude of the current flowing through the primary winding 22 so that the position of the drum relative to a stylus or pen 34 having a marking point 35 carried rigidly on a carriage 36 varies with the variation in H, the magnetomotive force on the primary winding. The carriage 36 is mounted slidably and pivotally on a fixed rod 41, and a lifting rod 48, which is supported by armatures 46 and 47 and positioned under arms 43 of the carriage, is lowered by energization of solenoid windings 44 and 45 from a retracted position holding the stylus point 35 out of contact with the sheet 12 to an operative position in which the point 35 engages the sheet 12. A wire belt 51 coursing on guide pulleys 52 is driven by a drive pulley 53 reversibly rotatable by a servomotor drive 54. The servomotor drive 54 drives the pulley 53 in such directions that the carriage 36 is slid along the rod 41 to position the stylus point 35 along the drum to a point directly proportional to the B, the flux, of the core 21. A type of servomotor drive suitable for use as the drives 31 and 54 is that used in the commercially available "Speedomax" recorder manufactured by Leeds and Northrup Company.

In testing the coil 11, leads 61 and 62 of the coil winding 22 are connected by an operator to terminals 63 and 64, and leads 65 and 66 are connected to terminals 67 and 68. A manually operable switch 69 in a powerline 70 is closed after setting a fine B-sensitivity control rheostat 71 and a coarse B-sensitivity control rheostat 72. A manual switch 81 is closed momentarily to energize the solenoids 44 and 45 to bring the stylus or pen point 35 into contact with the sheet 12, and bring in a relay 82 to close holding contacts 83, which lock in the relay 82 and the solenoids 44 and 45 through resetting contacts 84 and 85 of a relay 86. A contactor 91 of a manual switch 92 then is moved momentarily out of engagement with a contact 93 and into engagement with a contact 94 to energize a reset relay winding 95 of a selector relay 96 to pull a latching pawl 97 out of engagement with a drive ratchet wheel 98 to permit a coil spring 99 to reset, through a shaft 107, contactors 101 and 102 to zero or start positions in which they engage number "0" ones of contacts 103 and 104 of contact banks 105 and 106.

The contactor 91 then is released, and engages the contact 93 of the switch 92 to energize, through contacts 109 of a relay 110, a stepping relay 111 to move the wheel 98 one step through a stepping pawl 112. This moves the contactors 101 and 102 into engagement with the number "1" contacts of the banks 105 and 106. The contactor 101 then energizes a relay 115, and the relay 115 locks itself in through holding contacts 117 and resetting contacts 116 of the relay 110 and closes contacts 118 in an A.C. powerline 119 having conductors 120, 121 and 122. Assuming that, at this time, a carriage 131 on a lead screw 132 of a voltage regulating device 133 is in its uppermost position, as viewed in Fig. 2, in which an actuator 134 on the carriage 131 engages and closes a limit switch 135, as opposed to its lowermost position, in which an actuator 136 on the carriage engages and closes a limit switch 137, a constant speed, reversible motor 138 is energized through contacts 141, 142, 143 and 144 of a relay 145 in such a direction as to drive the lead screw 132 in a direction moving the carriage 131 downwardly.

As the carriage is moved downwardly, interconnected bridging contactors 151 and 152 on the carriage 131 are moved along helical resistance wires 153 and 154 on insulating drums 155 and 156 rotated by gearing 157 driven by the screw 132 at such speeds that the contactors 151 and 152 travel always on the wires 153 and 154. Brush leads 161 and 162 are connected to the opposite ends of the wire 153, and a brush lead 163 is connected to the lower end of the wire 154. A battery 171 is connected to the leads 161 and 162 through contacts 172, 173, 174 and 175 of a relay 176 to apply its potential in one direction to the opposite ends of the resistance wire 153, and the contactor 151 picks off the potential on the portion of the wire 153 between the brush lead 162 and the contactor 151, and applies this potential to the winding 22 through the contactor 152, the portion of the resistance wire 154 between the contactor 152 and the brush lead 163 and a resistor 181 of constant resistance. Thus, as the contactor 151 moves from the brush lead 161, the potential therebetween becomes higher and the resistance of the portion of the wire 154 between the contactor 152 and the brush lead 163 becomes lower. Thus, the potential drop across the resistor 181 increases and the potential across the winding 22 increases. The potential across the resistor 181 is proportional to the magnetizing current through the winding 22 and is applied to the servomotor drive 31 so that the position of the drum is precisely determined by the voltage and direction thereof across the resistor 181. Certain features of the control device 133 are disclosed and claimed in my copending application Serial No. 485,251, filed January 31, 1955, for "Current Control Apparatus." The action of the control device is to produce a slow rate of rise of the H or magnetizing current to the winding 22 and the rate of rise of voltage to drive 31 initially and increase them greater than linearly proceeding from zero voltage and current so that any lag in pen movement is compensated for. That is, while B is changing most rapidly, the drum 13 is rotated most slowly.

As the magnetizing current is increased from zero to its positive maximum as just described, the induced flux change in the core 21 generates voltage across the leads 65 and 66 of the secondary winding 23, which is applied through a calibrating switch 194 to a fluxmeter 191 of a well known commercially available type. The fluxmeter generates in a slave coil 192 an output voltage proportional to the flux or B, and the slave coil 192 applies the generated voltage through the rheostats or potentiometers 71 and 72 to the servomotor drive 54, which moves the pen point 35 to the left, as viewed in Fig. 1, and a normal induction curve 196 is formed on the sheet 12.

As the bridging contactors 151 and 152 reach the lower ends of the wires 153 and 154, the actuator 136 closes the limit switch 137, which energizes the stepping relay to move the contactors 101 and 102 from the number 1 contacts 103 and 104 to the number 2 contacts 105. This energizes the relay 145 to move contacts 142 and 144 from contacts 141 and 143 to contacts 198 and 199 to reverse the motor 138. While the contactor 101 and the number 2 contacts 105 are engaged, the relay 145 is locked in. This also is true while the contactor 101, later, engages the number 4 contact 105 or the number 6 contact 105, and relay 145 is deenergized while the contactor 101 engages the odd numbered contacts 103. The relay 145 controls the direction of rotation of the motor 138.

With the contactor 101 in position 2, the motor 138 and the drive 31 are reversed, and the pen point 35 forms a curve segment 201 from a Positive Maximum Point to a Residual Induction Point, which is reached as the carriage 131 reaches the upper limit of its travel and closes the limit switch 135 to stop the relay 96 and reverse the motor 138. As the contactor 102 engages the number 3 contact 104, the relay 176 is energized to reverse the polarity of the battery as applied to the drive 31 and the winding 22 so that the drum 13 continues to be driven in the same direction. As the carriage 131 travels downwardly, a curve segment 205 is formed from the Residual Induction Point to a Negative Maximum Point.

Then the limit switch 137 is again closed to step the contactors 101 and 102 to position 4 and the motor 138 is reversed. The pen point 35 and the drum 13 are so moved as to form a curve segment 206 from the Negative Maximum Point to a Negative Residual Induction Point, and the relay 96 is stepped to position 5, at which the motor 138 is reversed, and the relay 176 is dropped out to again reverse voltage polarity to the winding 22 and the drive 31. The drum 13 continues to be driven in the same direction, and the voltage to the winding 22 is reversed in direction so that a curve segment 207 is drawn from the Negative Residual Induction Point to the Maximum Positive Point as the motor 138 moves the carriage 131 downwardly along the drums 155 and 156. Then, as the relay 96 is stepped to position 6, the contactor 102 closes an energizing circuit to the relay 86, which breaks contacts 84 and 85 to drop out the relay 82. This deenergizes the solenoid windings 44 and 45 to permit the armatures 46 and 47 to lift the rod 48, which lifts the pen point 35 out of contact with the sheet 12. As the carriage 131 moves back up during position 6 of the relay 96, the pen point 35 travels back along the curve segment 201 to an ordinate 211. Then, as the relay 96 is stepped to position 7, the relays 110, 115 and 145 are dropped out. The sheet 12 then may be removed and replaced and the coil 11 removed and replaced with another coil to be tested as described hereinabove.

A relay 221 is energized during position 4 to maintain energization of the polarity controlling relay 176 during formation of the curve segment 206. Thus the negative polarity of H is maintained while the magnitude thereof is decreased during position 4 of the relay 96. Manual momentary switches 225 and 226 are provided to shift the pen point 35 along the ordinate 211 in cooperation with a battery 227 and potential dividers 228 and 229.

The operation of the voltage control device 133 is such that, on increasing H starting from its minimum value, the voltage picked up by the contactor 151 initially is low gradually, increases as the wire 153 is gradually cut out and the resistance of the wire 154 gradually decreases as it is cut out. This makes the voltage output of the device 133 increase slowly initially while the core is unsaturated so that the B position, which is rapidly changing, is not distorted because of lag of the fluxmeter 191. Then, when the core is becoming saturated, the voltage output of the device 133 rapidly increases and the drum 13 is moved more rapidly while the core is saturated and there is not much movement required by the servomotor drive 54. Thus, on the initial portion of the curve segment 201 the movement of the drum 13 is rapid and gradually decreases as the core becomes less saturated. On the initial portion of the curve segment 205, the drum movement is slow and becomes more rapid when approaching negative saturation. Likewise, in the curve segment 206, the drum movement decreases from rapid to slow as the core becomes less saturated. During the formation of the segment 207, the movement of the drum increases rapidly in the positive saturation period. Thus, the curve 10 is very accurate while speed is obtained in the saturated zones.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An electrical testing apparatus, which comprises a visually indicating device having rectilinear coordinate means for forming a trace on said device, servomotor means for effecting movement of said trace-forming means along one coordinate, a second servomotor means for effecting movement of said trace-forming means along the other coordinate, means for applying a varying voltage and current to a coil having a magnetic core, switching means operated by the voltage applying means applying a predetermined maximum voltage for reversing the second servomotor means, means for actuating the first movement-effecting means in accordance with change in the flux density of the core, means for actuating the second movement-effecting means in accordance with the change in current through the coil, and means operated by the switching means for reversing the polarity of the current.

2. A testing apparatus, which comprises a platen for supporting a sheet of graph paper, a marker, a voltage responsive servomotor drive for moving the platen relative to the marker along one coordinate, means for reversing said servomotor drive, a second voltage responsive servomotor drive for moving the marker relative to the platen along the other coordinate, means for applying a gradually increasing voltage to a coil having a magnetic core, means operated by said voltage applying means for operating said reversing means and said voltage applying means to apply a gradually decreasing voltage to said coil, means for applying a voltage to the first drive in accordance with the voltage applied to the coil, and means for applying a voltage to the second drive in accordance with flux induced in the core.

3. A testing apparatus, which comprises a support for carrying a sheet of graph paper, a marker for marking the sheet, a voltage responsive servomotor drive for effecting relative movement between the support and the marker along one coordinate, a second voltage responsive servomotor drive for effecting relative movement between the marker and the support along the other coordinate, a cycling device for applying an aternating voltage through 450° to a coil having a magnetic core, means for applying a voltage to the first drive proportional to the voltage applied to the coil, and means for applying a voltage to the second drive proportional to flux in the core.

4. A testing apparatus, which comprises a platen for supporting a sheet of graph paper and movable along one coordinate of the sheet, a marking pen movable along the other coordinate of the sheet, a voltage responsive servomotor drive for moving the platen along the first-mentioned coordinate, a second voltage responsive servomotor drive for moving the pen along the other coordinate, a cycling means for applying an alternating voltage through 450° electrical degrees to a coil having a magnetic core, means for controlling the cycling means to increase the applied voltage slowly while the core is unsaturated and more rapidly as the core approaches saturation, means for applying a voltage to the first drive proportional to the voltage applied to the coil, and means for applying a voltage to the second drive proportional to flux in the core.

5. A testing apparatus, which comprises a drum rotatably mounted for carrying a sheet of graph paper, a servomotor drive for rotating the drum, means for applying a slowly alternating voltage to a winding of a test coil having a magnetic core, means operated by the voltage applying means applying a maximum voltage for reversing the servomotor device, means responsive to current through the coil for actuating the servomotor drive, means for marking the paper movable along the drum, a second servomotor drive for moving the marking means along the drum, means responsive to direction and density of flux in the coil core for actuating the second servomotor drive, and switching means operated by the voltage applying means for reversing the direction of flux in the coil core.

6. A testing apparatus, which comprises a drum rotatably mounted for carrying a sheet of graph paper, a servomotor drive for rotating the drum, means for applying a slowly alternating current voltage to a winding of a test coil having a magnetic core, means operated by said voltage applying means for reversing the direction of rotation of the servomotor drive upon each reversal of the alternating current voltage, means for regulating the voltage-applying means so as to increase the current in the coil slowly during the initial portion of each quarter cycle and rapidly during the end portion of each quarter cycle, means responsive to current in the coil for actuating the servomotor drive, a marking pen movable along the drum for marking the paper, a second servomotor drive for moving the pen along the drum, means responsive to direction and density of flux in the coil core for actuating the second servomotor drive, and switching means operated by the alternating current voltage applying means for reversing the polarity of current applied to the winding of the test coil.

7. An apparatus for drawing B–H curves, which comprises a drum carrying a first sheet of graph paper, a servomotor drive for rotating the drum, means for applying an alternating current voltage to a test coil having a magnetic core, means for regulating the voltage-applying means so as to apply the voltage to the coil slowly while the core is below saturation and rapidly as the core approaches saturation, a marker reciprocable along the drum, a second servomotor drive operable in proportion to the direction and density of flux in the coil core for moving the stylus along the drum a stepping switch cyclically operated by the current voltage applying means for controlling the first servomotor drive, and means operated by the stepping switch operating a predetermined number of times for lifting the marker from the drum.

8. A curve-drawing apparatus, which comprises a drum, servomotor means for rotating the drum, a constant D.C. voltage source, variable resistance means connecting the servomotor means and a winding of a coil also having a permeable core to the voltage source, said resistance means being adjustable between a maximum resistance and a minimum resistance, a reversible motor for adjusting the variable resistance means between said resistances, relay means for controlling the direction of operation of the reversible motor, switching means operable by the reversible motor as the resistance means reaches said maximum resistance for actuating the relay means to reverse the reversible motor, second switching means operable by the reversible motor as the resistance means reaches said minimum resistance for reversing the relay means, switching means operable by each actuation of the first switching means and the second switching means for reversing the connections between the voltage source and the servomotor means and the coil winding on each actuation of the second switching means, a marker movable along the drum, second servomotor means for moving the marker, and means responsive to the direction of and quantity of flux in the core for controlling the position of the second servomotor means.

9. A curve-drawing apparatus, which comprises a drum, servomotor means for rotating the drum, a constant D.C. voltage source, variable resistance means connecting the servomotor means and a winding of a coil also having a permeable core to the voltage source, said resistance means being adjustable between a maximum resistance and a minimum resistance, a reversible motor for adjusting the variable resistance means between said resistances, relay means for controlling the direction of operation of the reversible motor, stepping switch means for energizing and deenergizing the relay means on alternate actuations thereof, switching means operable by the reversible motor as the resistance means reaches said maximum resistance for actuating the stepping switch means to actuate the relay means to reverse the reversible motor, second switching means operable by the reversible motor as the resistance means reaches said minimum resistance for actuating the stepping switch means to actuate the relay means to reverse the reversible motor, said stepping switch means being operable by each actuation of the second switching means to reverse the connections between the voltage source and the servomotor means and the coil winding, a marker movable along the drum, second servomotor means for moving the marker, and means responsive to the direction of and quantity of flux in the core for controlling the position of the second servomotor means.

10. A curve-drawing apparatus, which comprises a drum, servomotor means for rotating the drum, a constant D.C. voltage source, variable resistance means connecting the servomotor means and a winding of a coil also having a permeable core in series with one another and the voltage source, said resistance means being adjustable between a maximum resistance and a minimum resistance, a reversible motor for adjusting the variable resistance means between said resistances, stepping switch means for reversing the motor on each step thereof, switching means operable by the reversible motor as the resistance means reaches said maximum resistance for stepping the stepping switch means to reverse the reversible motor, second switching means operable by the reversible motor as the resistance means reaches said minimum resistance for stepping the stepping switch means, said stepping switch means being operable by each actuation by the second switching means to reverse the connections between the voltage source and the servomotor means and the coil winding, a marker movable along the drum, second servomotor means for moving the marker, and means responsive to the direction of and quantity of flux in the core for controlling the position of the second servomotor means.

11. In a magnetization testing apparatus for a core, a current source, a voltage control means connected to said source and a core to be tested, drive means for operating said voltage control means, a switching circuit operated by said drive means for reversing said drive means, and means operated by a predetermined number of operations of said switching circuit for reversing the polarity of the current applied from the source to the voltage control means.

12. In a magnetization recorder, a voltage control means, a current source connected to said voltage control means, drive means for said voltage control means, a stepping switch control circuit for controlling the drive means, means operated by the drive means for operating the stepping switch control circuit to cyclically reverse the drive means, means for applying the output of the voltage control means to a core under test, a recording device adapted to be operated in accordance with the magnetization of the core, and means operated by a predetermined number of operations of the stepping switch control circuit for reversing the polarity of the current from the source applied to the voltage control means.

13. In a hysteresis loop recorder, a current source of a first polarity, a voltage regulating means connected to said current source, drive means for operating said voltage regulating means to provide a varying output voltage, switching means operated by the drive means for cyclically reversing said drive means, a recording device mounted to move in rectangular coordinate paths, means for applying the output of said voltage regulating means to a coil having a core to be tested, means for applying said varying output voltage to said recording device to move said device along a first coordinate path, means responsive to the flux induced in said core for moving the recording device along the other coordinate path, and means operated by said switching means for reversing the polarity of the current applied to said voltage regulating means.

14. In a magnetization curve recorder, a current source, a voltage regulating means connected to said current source, a switching circuit for operating the voltage regulating means, a core having a coil connected to said voltage regulating means, a means for cyclically operating the switching circuit to impress a varying voltage to the coil, a recorder device mounted to move along rectangular coordinates, means operated by the voltage regulating means for accordingly moving the recorder along one coordinate, means operated by the flux induced in the core for moving the recorder along the other coordinate, and means operated by the switching means for reversing the polarity of current from the source to the voltage regulating means.

15. An apparatus for drawing induction curves, which comprises a platen, means for moving the platen, a marker, means for holding the marker in engagement with the platen, means for moving the marker relative to the surface of the platen, means for applying a sequence of test voltages and currents to a coil of a core under test, a stepping switch controlled circuit for operating the voltage and current applying means, means responsive to the test current for accordingly operating said platen moving means, means responsive to the flux induced in said core for operating said marker moving means, and means operated by said stepping switch controlled circuit for operating the holding means to lift the marker from the platen.

References Cited in the file of this patent

UNITED STATES PATENTS

| | | |
|---|---|---|
| 1,574,350 | Johnson | Feb. 23, 1926 |
| 2,054,672 | Edgar | Sept. 15, 1936 |
| 2,283,742 | Leonard | May 19, 1942 |

OTHER REFERENCES

Electronics, July 1954, pages 147–149, article by Berge et al.

Proceedings of the Institute of Electrical Engineers, vol. 101, No. 82, August 1954, pages 417–427, article by Ross.